United States Patent [19]

Overbury et al.

[11] Patent Number: 4,713,668

[45] Date of Patent: Dec. 15, 1987

[54] ADAPTIVE ANTENNA

[75] Inventors: Francis G. Overbury, Great Dunmow; Christopher R. Ward, Bishop's Stortford; Jeffrey G. Searle, Stansted Mountfitchet, all of Great Britain

[73] Assignee: STC plc, London, England

[21] Appl. No.: 908,563

[22] Filed: Sep. 18, 1986

[51] Int. Cl.[4] .......................... G01S 3/16; G01S 3/28

[52] U.S. Cl. .................................................. 342/384

[58] Field of Search ............... 342/378, 383, 379, 384, 342/380, 381

[56] References Cited

U.S. PATENT DOCUMENTS 3,876,947 4/1975 Giraudon .......................... 342/384
4,495,502 1/1985 Masak .............................. 342/380

FOREIGN PATENT DOCUMENTS 0151502 8/1984 Japan .............................. 342/384

*Primary Examiner*—Theodore M. Blum
*Attorney, Agent, or Firm*—Lee, Smith & Zickert

[57] ABSTRACT

A steered adaptive antenna arrangement including an adaptive beamforming network 10 to which the output signals of an array of antenna elements are applied, the network having a feedback wherein the summed output of the network is correlated with each element signal, applied to a limiter and added to the steering component whereby the derived value is used to drive the associated weight coefficient, characterized in that the summed output of the beamformer network 10 is further applied to a desired signal estimator 11 the output of which is subtracted from the summed output to provide the feedback input 12 to be correlated with each element signal.

2 Claims, 18 Drawing Figures

SIGNAL AT BORESIGHT

SIGNAL AT 5°

SIGNAL AT 9°

SIGNAL AT 9.5°

SIGNAL AT 10°

SIGNAL AT 0° GAUSSIAN JAMMING

SIGNAL AT 5° GAUSSIAN JAMMING

SIGNAL AT 10°
GAUSSIAN
JAMMING

SIGNAL AT 10°
FM JAMMING $\tau$ = 20 SAMPLES $\tau$ = 1000 SAMPLES

SINGLE JAMMER REFERENCE NOT USED

3 JAMMERS REFERENCE NOT USED

3 JAMMERS REFERENCE INJECTED

ADAPTIVE ANTENNA

BACKGROUND OF THE INVENTION

This invention relates to a steered adaptive antenna arrangement for enhanced reception of constant envelope signals.

Recent work has shown how the misalignment sensitivity problem associated with steered adaptive arrays can be reduced by appling a limit on the computed weight update. A possible scheme is shown by FIG. 1. Here, the summed output is correlated with each element signal, applied to the limiter and added to the steering component. The derived value is then used to drive the associated weight coefficient. As indicated by the diagram, the limiter preserves phase information and simply restricts the modulus of the weight update component. Other forms of limiter can however be devised.

FIG. 2 illustrates the scheme simplistically in terms of the steering vector beam pattern and a "retro-beam" (derivable from the weight update vector) formed by the adaptive process. In principle, the system cancels the received signal by adjusting the direction and level of the retro-beam to match the response from the steering vector beam. By applying a modulus limit on the retro-beam gain, we can effectively prevent the array from cancelling any signal arriving from an angular sector close to peak of beam. For example, in the simulation results presented later on, a weight update limit of 0.7 times the modulus of the corresponding steering vector component gave rise to a protected zone of approximately one half of a beamwidth.

Whereas this technique can be shown to perform well under many circumstances, it does however suffer two significant problems caused by the presence of the desired signal in the adaptive process. These are:

(i) the method necessitates the use of low update gain factors (and hence implies relatively slow convergence) to maintain low weight jitter and an acceptable signal to noise ratio.

(ii) the desired signal can "capture" the limiters and lose adaptive degrees of freedom causing degraded nulling in the presence of multiple jammers.

To illustrate the first aspect, it can be shown that the fractional increase in error residual power $\beta$, due to random weight jitter ignoring the effect of the weight update limiter is $$\beta \propto GNP_{tot}$$

where N is the number of elements, G is the update gain factor and $P_{tot}$ is the total power at each element of the array. Since the mean residue at steady-state will be dominated by the desired signal, then the inverse of the $\beta$ factor indicates in effect the resultant signal to noise ratio at the beamformed output. Hence, maintaining low weight jitter becomes much more critical when adapting in the presence of the wanted signal. For example, if a 20 dB resultant signal-to-noise ratio (SNR) is required then the update gain factor must be set at a value some hundred times below the stability threshold (c.f. adaptation in the absence of the desired signal where a stability margin of 10 gives an acceptable weight jitter performance for most practical situations). In practical terms this could relate to a tenfold reduction in convergence rate.

FIGS. 3(*a*) to (*e*) illustrate the convergence of the steered processor for the following parameters;

single jammer (Gaussian envelope, OdBe at 45° rel. boresight.

wanted signal (constant envelope), −10 dBe at 0°, 5°, 9°, 9.5° and 1O° for FIGS. 3(*a*) to 3(*e*) respectively.

6 element linear array, $d/\lambda \simeq 0.5$.

boresight steering vector.

thermal noise floor, −50 dBe.

update gain factor, 0.1.

The results show the progressive cancellation of the desired signal as it becomes increasingly misaligned from the steering direction. Weight jitter performance (reflected by the achieved signal to jammer plus noise ratio) is slightly better than than predicted by the earlier equation. (This must be attributable to the limiting operation).

SUMMARY OF THE INVENTION

According to the present invention there is provided a steered adaptive antenna arrangement including an adaptive beamforming network to which the output signals of an array of antenna elements are applied, the network having a feedback wherein the summed output of the network is correlated with each element signal, applied to a limiter and added to a steering component whereby a derived value is used to drive an associated weight coefficient, characterised in that the summed output of the beamformer network is further applied to a desired signal estimator the output of which is subtracted from the summed output to provide the feedback input to be correlated with each element signal.

In a preferred embodiment of the invention the desired signal estimator comprises a zero crossing detector followed by a bandpass filter to which the summed output is applied to extract phase information and a multiplier to which the limiter output is applied together with a signal being the mean modulus of the summed output, the multiplier output being subtracted from the summed output to provide the feedback.

BRIEF DESCRIPTION OF THE DRAWINGS

Embodiments of the invention are now described with reference to the drawings, in which.

DESCRIPTION OF THE PREFERRED EMBODIMENTS

Figure 1:
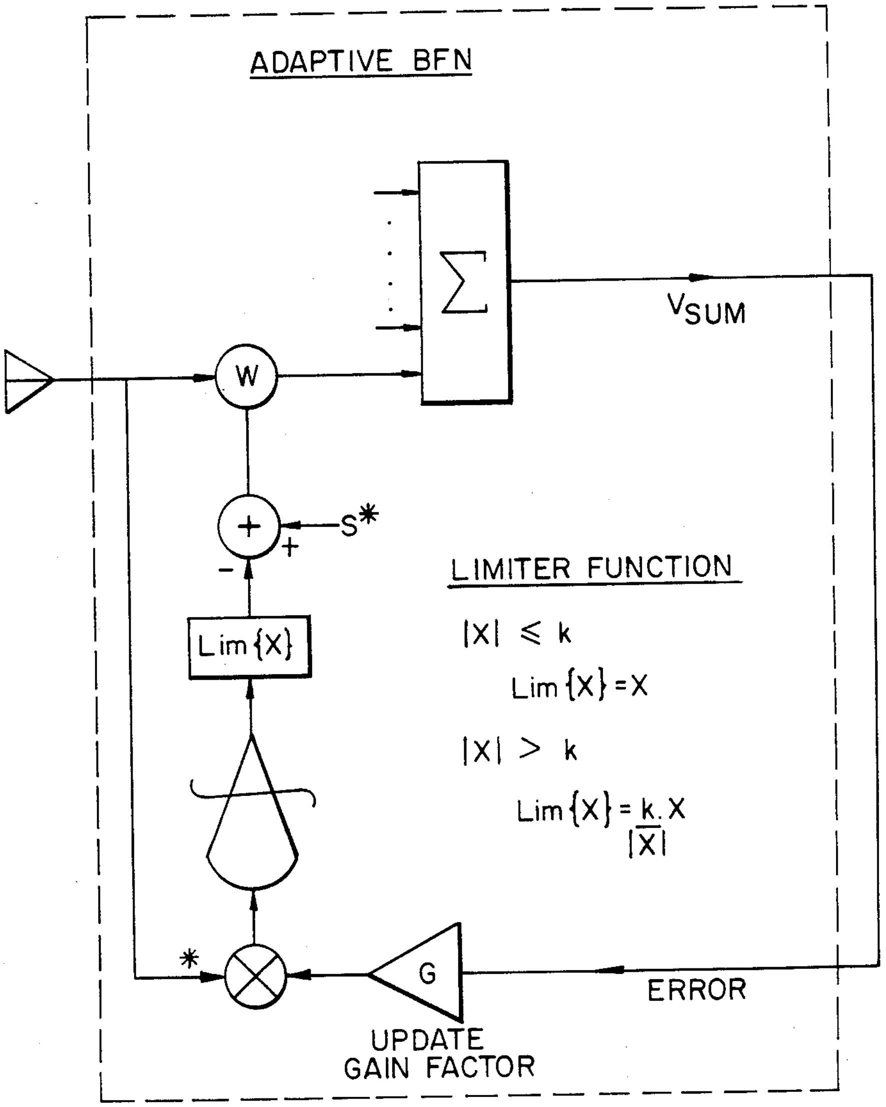
FIGS. 1–3 illustrate a prior art arrangement and its performance (already referred to)
Figure 2:
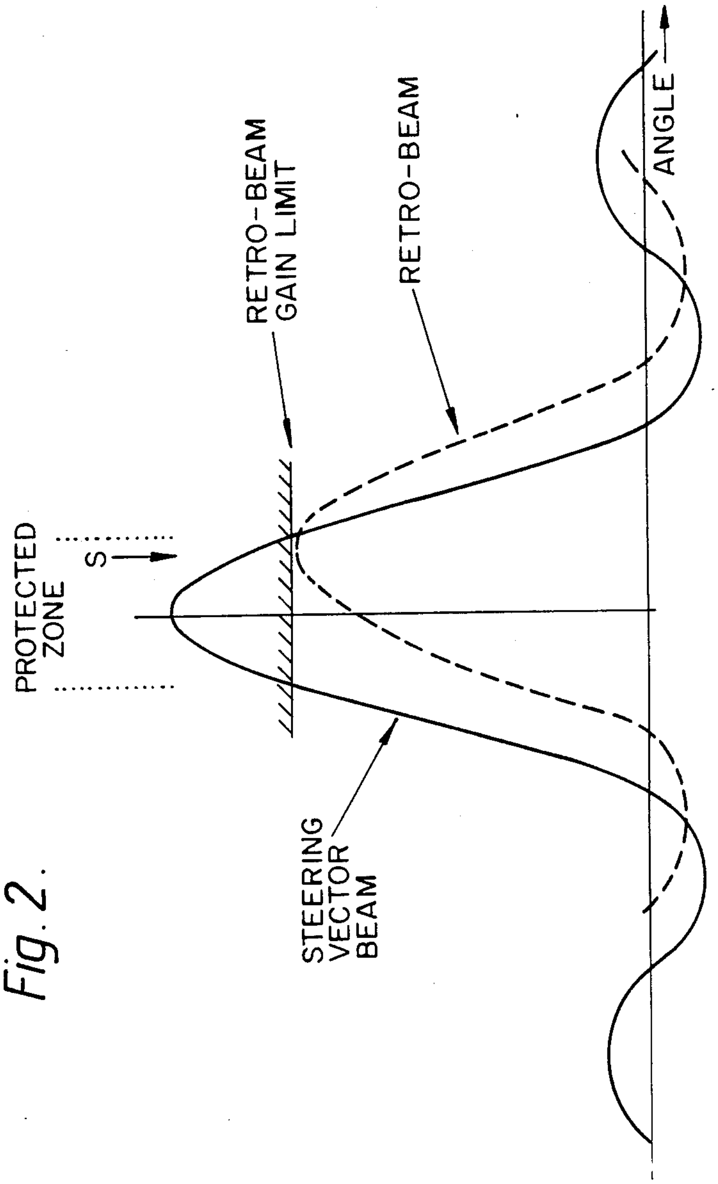
Figure 3A:
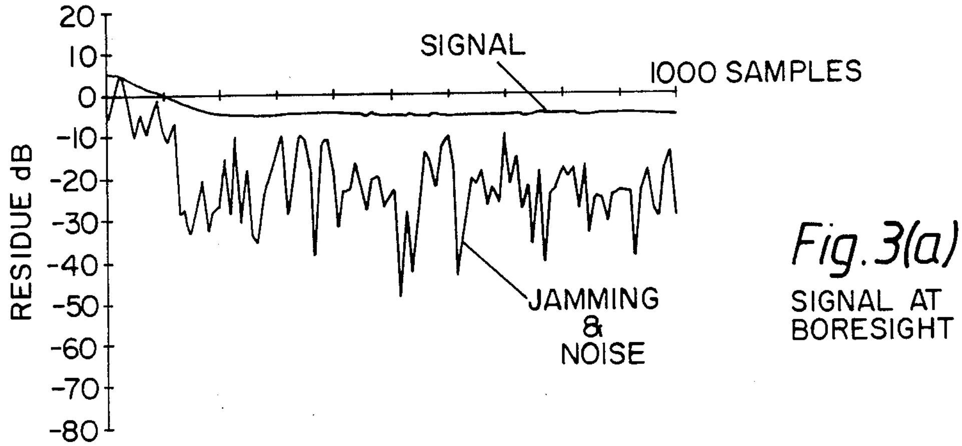
Figure 3B:
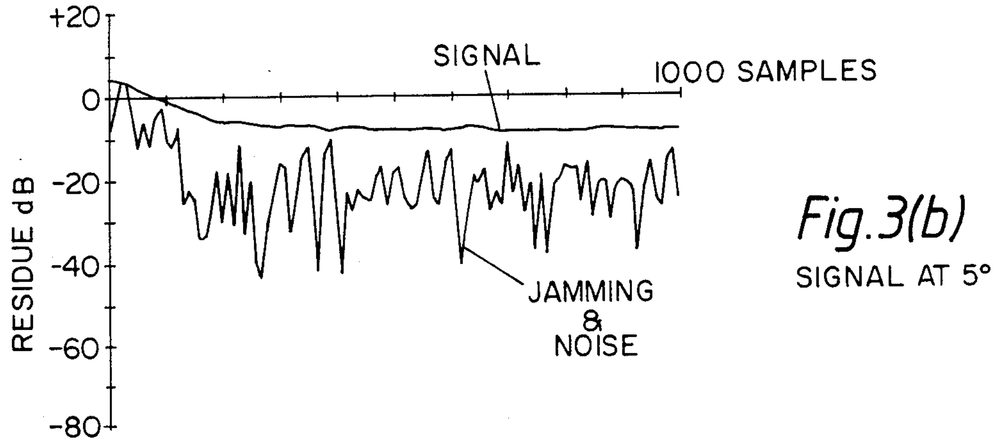
Figure 3C:
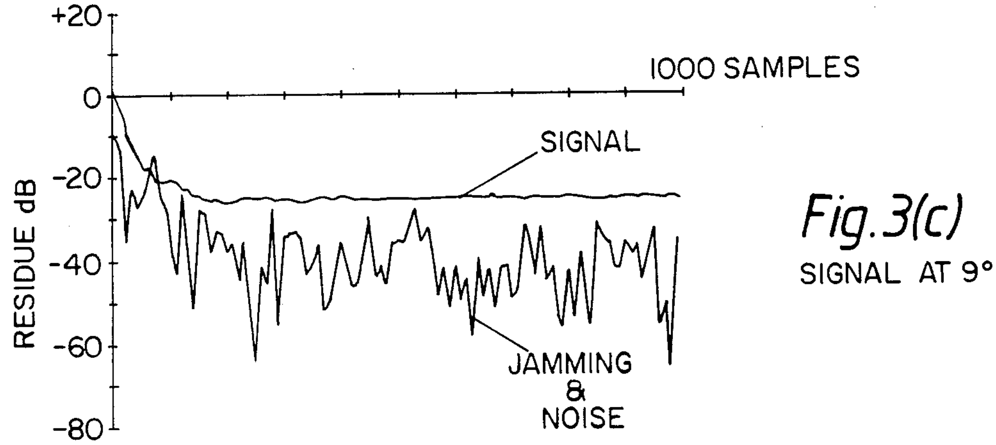
Figure 3D:
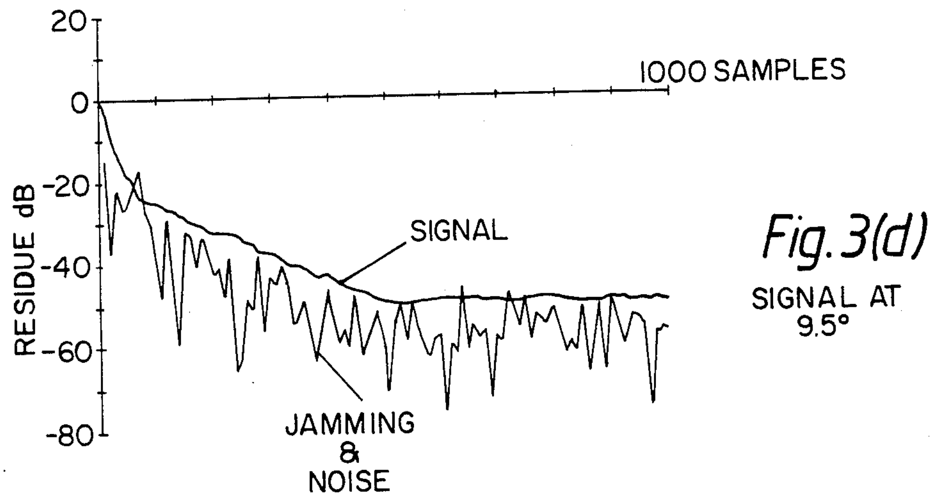
Figure 3E:
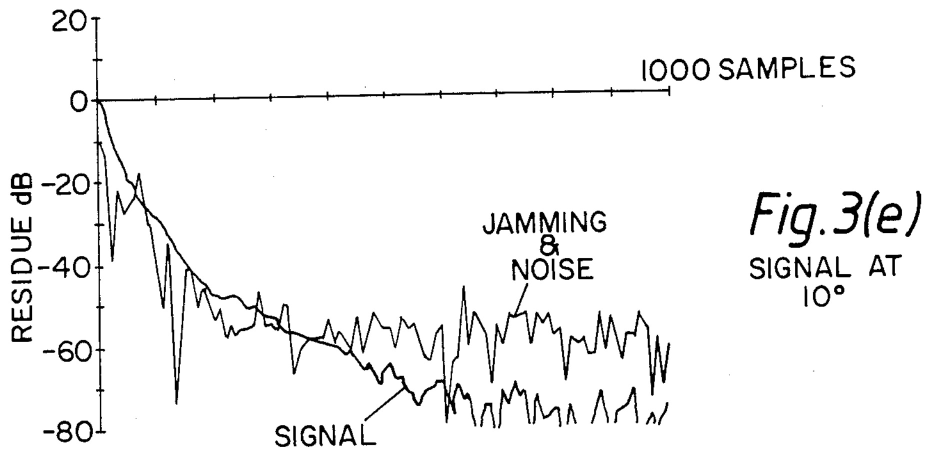
Figure 4:
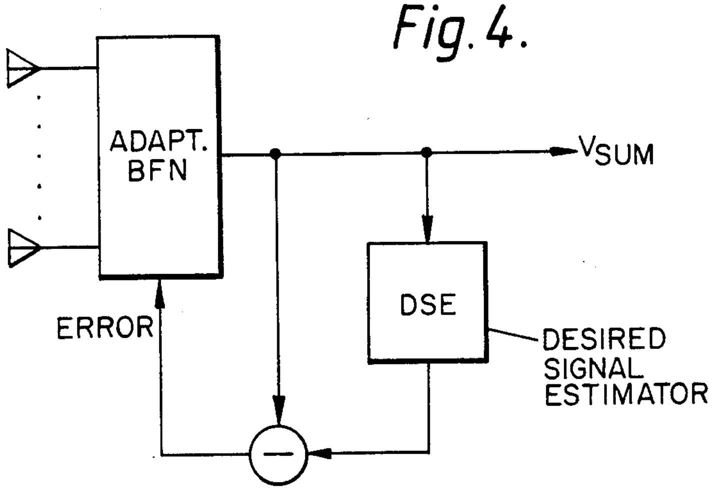
FIG. 4 illustrates a steered adaptive antenna beamforming arrangement with feedback.

FIG. 4 indicates simply how the wanted signal can be removed from the adaptive processor by the inclusion of a pseudo-reference signal. Here, the output from the beamformer 10 is used to provide the best estimate of the desired signal 11. This estimate is then subtracted from the beamformed output and the resultant error residual 12 applied to the adaptive process.

Figure 5:
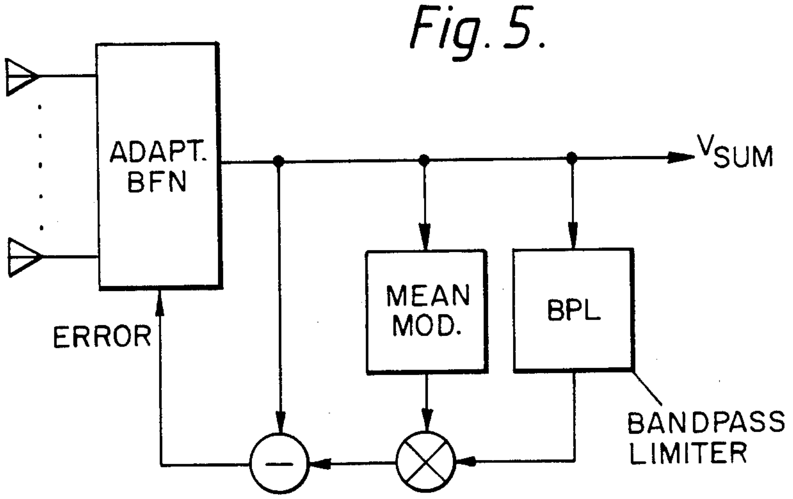
FIG. 5 illustrates the derivation of the desired signal estimate for the case of constant envelope modulation, FIGS. 6*a*–6*d* demonstrate the convergence performance of the arrangement of FIG. 4, FIGS. 7*a* & 7*b* illustrate prevention of FM jammer lock-up with the arrangement of FIG. 4, and FIGS. 8*a*–8*c* illustrate the performance of the arrangement of FIG. 4 in the presence of multiple jammers.
Figure 6A:
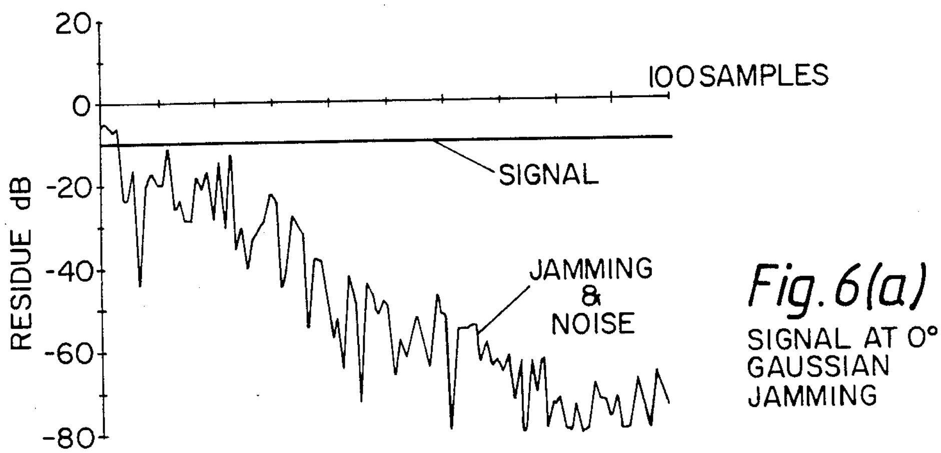
Figure 6B:
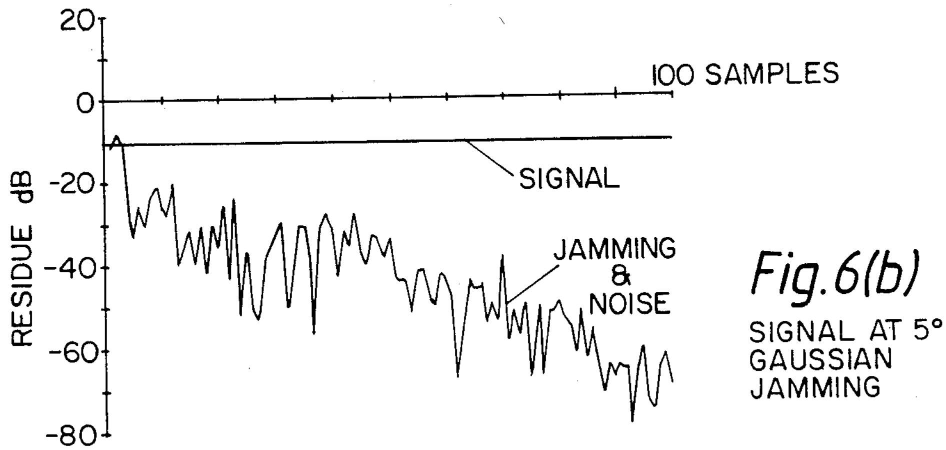
Figure 6C:
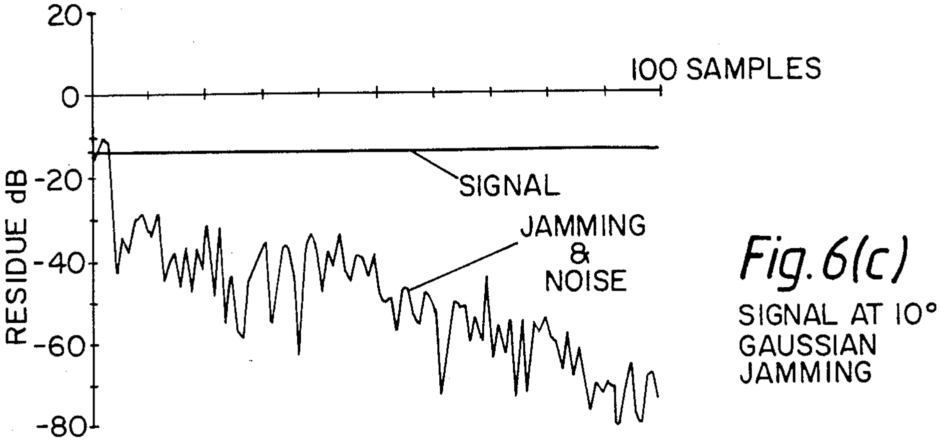
Figure 6D:
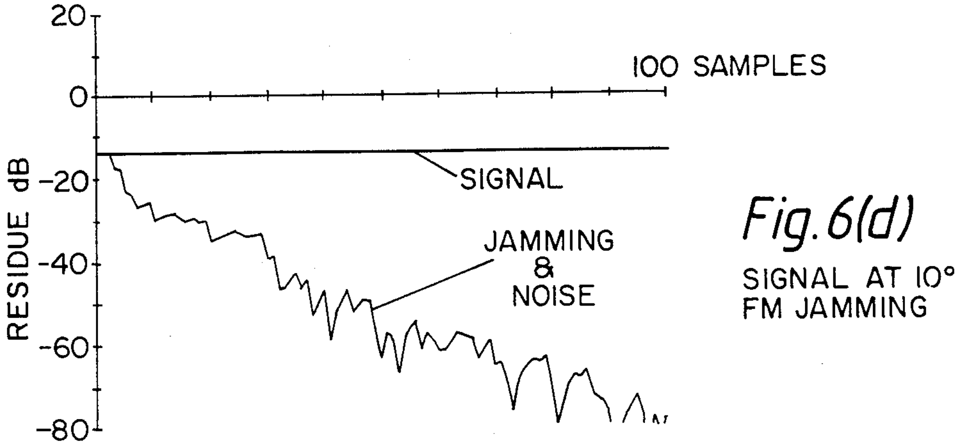

FIG. 5 shows the derivation of the desired signal estimate for the case of constant envelope modulation (e.g. an FM signal). The bandpass limiter 13 extracts the phase information by utilizing a fixed level zero crossing detector followed by a bandpass filter centred on the desired signal spectrum. The mean of the modulus 14 of the output of the array is then used to determine the level of the derived reference signal 15.

FIGS. 6(*a*) to (*c*) demonstrate the convergence performance of an adaptive beamformer incorporating both a steering vector with limited weight update and an FM reference signal. The following parameters were used for this simulation:

single jammer (Gaussian envelope), 0 dBe at 45° rel. boresight.
wanted signal (FM), −25 dBe at 0°, 5° and 10° for FIGS. 6(*a*) to (*c*) respectively.
6 element linear array, d/λ≃0.5.
boresight steering vector.
thermal noise floor, −100 dBe.
update gain factor, 0.1
mean modulus estimator time constant, 20 samples.

The results appear significantly superior to those given by FIGS. 3(*a*) to (*e*). In the steered/reference system, an extemely high SNR is obtained rapidly and there is an apparent lack of suppression of the desired signal as it becomes misaligned from the steering direction. In fact, the reference signal process takes full control when the desired signal falls outside of the mainlobe protected zone and this prevents any appreciable signal suppression, i.e. the system operates as a conventional reference signal process.

FIG. 6(*d*) shows the result corresponding to a 1O° misalignment of desired signal/steering direction but with a constant envelope jammer. For this example, there is no indication of the reference loop being "pulled" or "captured" by the jammer and performance is very satisfactory.

Figure 7A:
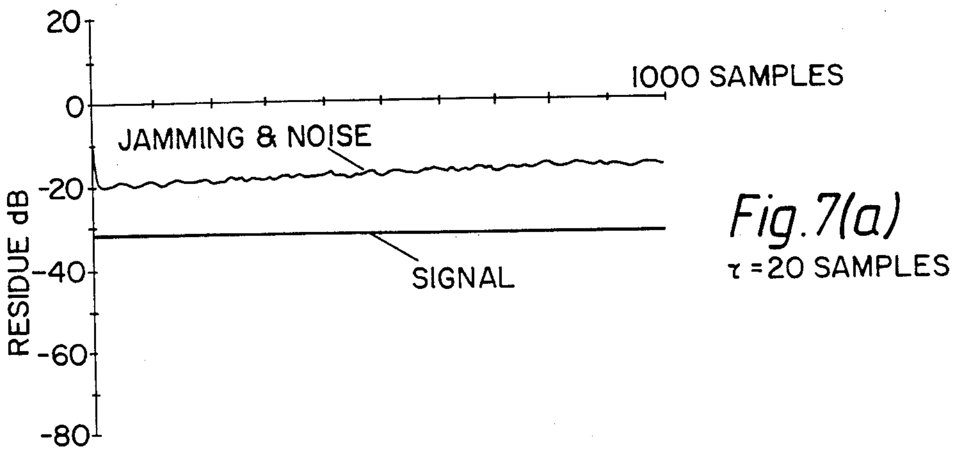
Figure 7B:
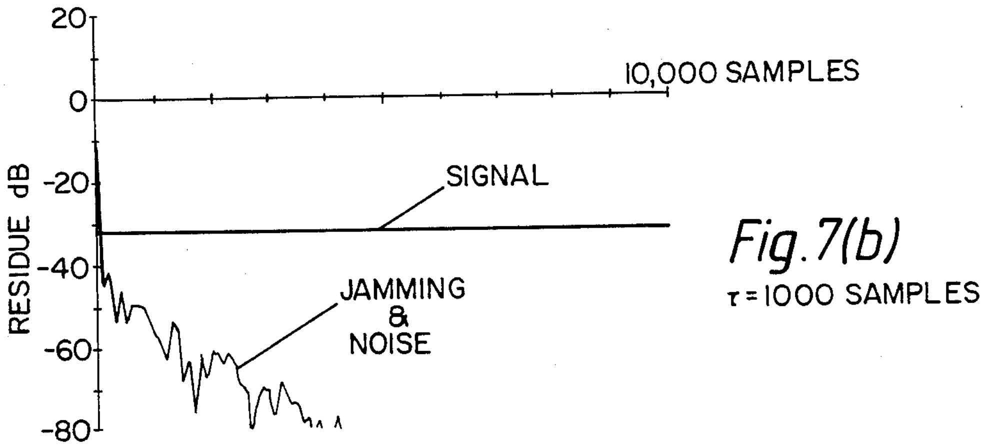

FIG. 7 shows the simulation results for a situation where the reference loop is "captured" by FM jamming (FIG. 7(*a*)) but demonstrates how this can be simply defeated by adjusting the time constant of the mean modulus estimation filter (FIG. 7(*b*)). This simulation assumed the following parameters:

single jammer (constant envelope), 0 dBe at 45° rel. boresight.
desired signal (constant envelope), −45 dBe at 8° rel. boresight.
6 element linear array, d/λ≃0.5.
boresight steering vector.
thermal noise floor, −100 dBe.
update gain factor, 0.1.
mean modulus estimator time constant, 20 samples for FIG. 7(*a*), 1000 samples for FIG. 7(*b*).

FIG. 7(i a) indicates that the beamformer has effectively "locked" onto the FM jammer, however, this is believed to be only a transitory condition and that there will be a weak drive into the adaptive process towards the solution providing a good SNR. Convergence to this condition will be extremely slow. The "locked" condition can be prevented by adjusting the time constant of the mean modulus estimation filter so that it responds moderately slowly compared with the adaptive null forming response time. Hence, the adaptive cancellation process will null the jamming signal before the reference loop can implement its "removal" from the applied error residual.

Figure 8A:
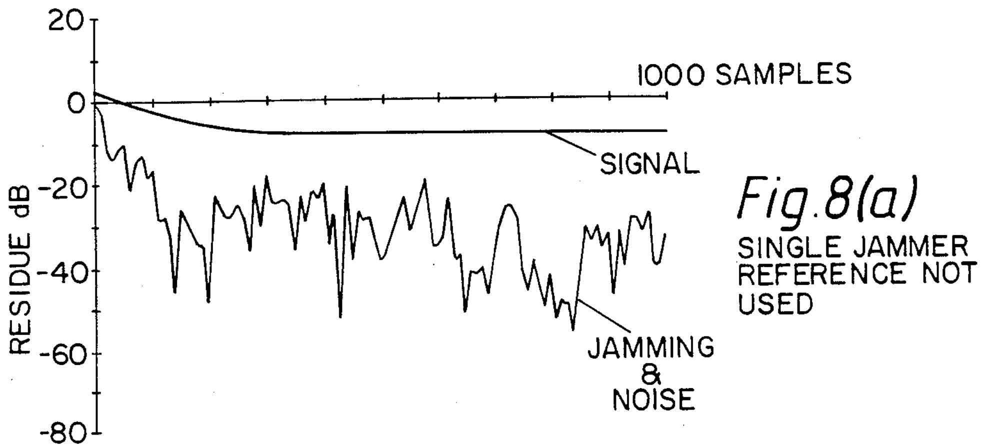
Figure 8B:
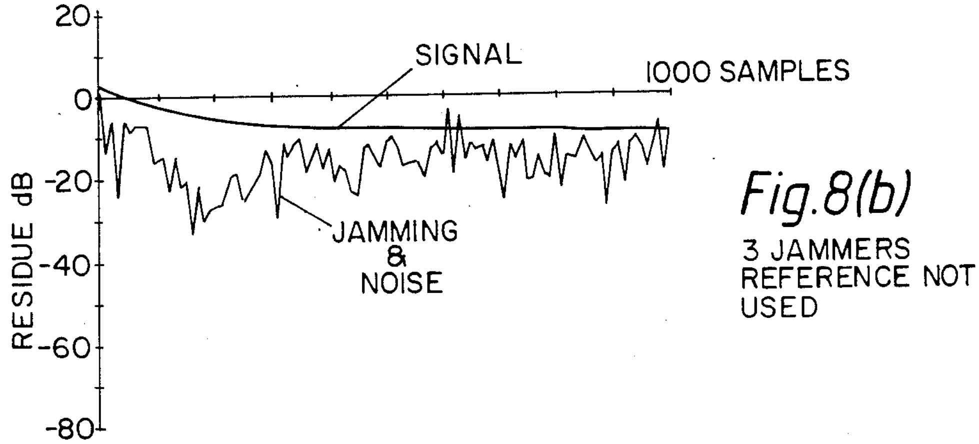
Figure 8C:
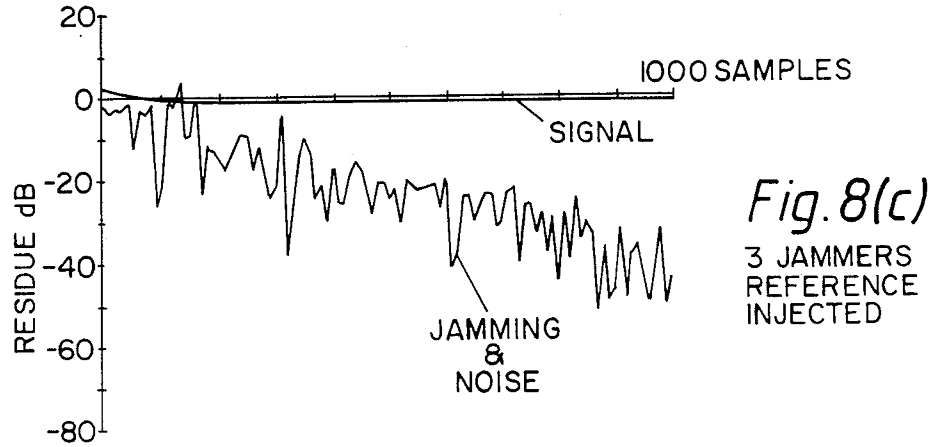

FIGS. 8(*a*), (*b*) and (*c*) demonstrate how the steering vector method with limited weight update can give rise to degraded nulling in the presence of multiple jammers and how performance can be improved by the inclusion of the reference signal. The following parameters were assumed in these simulations:

all jammers (Gaussian envelope) at 0 dBe, arriving outside of the steering vector mainlobe response.
desired signal (constant envelope), −10 dBe at boresight.
4 element linear array, d/λ≃0.5.
boresight steering vector.
thermal noise floor, −100 dBe.
update gain factors, 0.01 (steering vector only) and 0.1 (steering vector and FM reference).
mean modulus estimator (applicable to FM reference method) time constant, 20 samples.

FIG. 8(*a*) shows the convergence of the steered processor to a single jammer. The update gain factor has been reduced to a lower value in this example to achieve a mean cancellation level of approximately 30 dB (limited only by weight jitter). FIG. 8(*b*) shows a corresponding result in the presence of 3 equal power jammers. The cancellation performance has been degraded significantly, caused by the limiting process within the correlation loops having reduced the available degrees of freedom. However, when the FM reference signal is incorporated, the desired signal drive into each of the correlation loops is eliminated and consequently the weight update limiting process is not exercised (as shown by FIG. 8(*c*)).

The preliminary results have shown that the benefits of the steering/reference signal combination can be considerable in terms of improved convergence and cancellation performance, particularly in the presence of multiple jammers. Of significant interest is the ability of the system to isolate weak signals in the presence of stronger constant envelope signals or jammers. In this situation, an extremely high level of discrimination can be achieved provided that the unwanted signals do not fall within the protected zone defined by the steering vector mainbeam.

I claim:

1. A steered adaptive antenna arrangement including an adaptive beamforming network to which the output signals of an array of antenna elements are applied, the network having a feedback wherein the summed output of the network is correlated with each element signal, applied to a limiter and added to a steering component whereby a derived value is used to drive an associated weight coefficient, characterised in that the summed output of the beamformer network is further applied to a desired signal estimator the output of which is subtracted from the summed output to provide the feedback input to be correlated with each element signal.

2. An adaptive antenna arrangement according to claim 1 wherein the desired signal estimator comprises a zero crossing detector to which the summed output of the beamformer network is applied, a bandpass filter to which the zero crossing detector output is applied to extract phase information and a multiplier to which the filter output is applied together with a signal being the mean of the modulus of the summed output, the multiplier output being substracted from the summed output to provide the feedback.

* * * * *